US005421848A

United States Patent [19]

Maier et al.

[11] Patent Number: 5,421,848

[45] Date of Patent: Jun. 6, 1995

[54] METHOD FOR FABRICATING A LENS HAVING A VARIABLE REFRACTIVE INDEX

[75] Inventors: Gerhard Maier, Dauchingen, Germany; David Harrison, Strasbourg, France; Masahiro Fujimoto, Kawasaki, Japan

[73] Assignee: Thomson Consumer Electronics, S.A., Courbevoie, France

[21] Appl. No.: 39,092

[22] PCT Filed: Oct. 18, 1991

[86] PCT No.: PCT/EP91/01981

§ 371 Date: Jun. 28, 1993

§ 102(e) Date: Jun. 28, 1993

[87] PCT Pub. No.: WO92/08254

PCT Pub. Date: May 14, 1992

[30] Foreign Application Priority Data

Oct. 29, 1990 [FR] France ............................ 90 403051

[51] Int. Cl.[6] ........................ C03B 23/00; B29D 11/00

[52] U.S. Cl. ........................................ 65/102; 65/111; 264/1.1; 264/1.24; 359/652

[58] Field of Search ........................ 65/4.1, 4.2, 37, 66, 65/4.21, 10.1, 102, 111, 387, 406; 343/909, 911 R, 911 L; 264/1.1, 1.5, 1.7, 2.1, 1.24, 1.28; 359/652, 653, 654

[56] References Cited

U.S. PATENT DOCUMENTS

| | | | |
|---|---|---|---|
| 3,023,135 | 2/1962 | Wiltshire | 343/911 R |
| 3,115,271 | 12/1963 | Anderson et al. . | |
| 3,274,668 | 9/1966 | Horst . | |
| 3,307,196 | 2/1967 | Horst . | |
| 4,288,337 | 9/1981 | Ota et al. | 252/512 |
| 4,482,513 | 11/1984 | Auletti | 264/39 |

*Primary Examiner*—W. Gary Jones
*Assistant Examiner*—Steven P. Griffin
*Attorney, Agent, or Firm*—J. S. Tripoli; E. P. Herrmann; F. A. Wein

[57] ABSTRACT

The invention presents a method for the fabrication or production of three-dimensional lenses with a variable refractive index by wrapping a material with a given refractive index. It is preferred, that this material has the shape of a thread, which might be cylindrical. The preferred shape of the lens to be produced is spherical or semi-spherical, which can be achieved by an appropiate wrapping process or by cutting the spherical shape. By the inventive method it is possible to produce the said lenses with a smooth varying of the refractive index. It is preferred to use the produced lenses as part of a microwave antenna system.

6 Claims, 1 Drawing Sheet

METHOD FOR FABRICATING A LENS HAVING A VARIABLE REFRACTIVE INDEX

Figure 1:
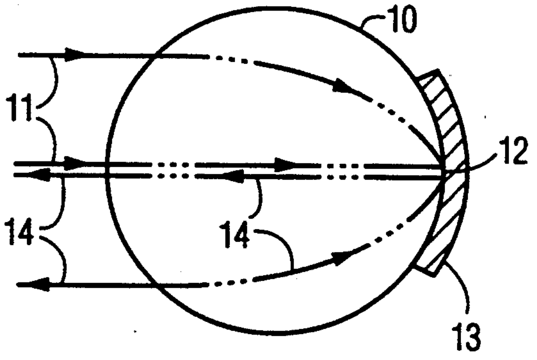
FIG. 1 PRIOR ART

The invention relates to a method for the fabrication of three-dimensional lenses with a variable refractive index.

Lenses with a variable refractive index, such as a Luneburg lens or a Eaton-Lippmann lens, are well known.

It is also known, e.g. from U.S. Pat. No. 4,288,337, that lenses with variable refractive indexes can be used as radar reflectors or, as is known from E. F. Buckley; "Stepped-Index Luneburg Lenses"; Electronic Design, Apr. 13, 1960, as part of an antenna system.

As Buckley has described in said article, it i s a known method for the fabrication of Luneburg lenses to use a hemispherical-shell construction with a given number of layers.

According to said US patent the layers for the fabrication of Luneburg and Eaton-Lippmann lenses can be produced by mixed dielectrics. Such a mixed dielectric can be obtained by mixing expanded particles selected from the group consisting of expanded polystrols, expanded polyethylenes, expanded polyurethanes, glass balloons and silica balloons, with metal-coated particles consisting of said expanded particles, surfaces of which have been coated with a thin film selected from the group consisting of chromium, aluminium, copper, nickel, gold, silver, and magnesium in proper proportions to obtain a desired eielectric constant the forming the same to the desired shape by the use of a binder.

From the article "A multiple-beam multiple-frequency spherical Lens Antenna System providing hemispherical Coverage" of M. A. Mitchel et al.; 6. International Conference on Antennas and Propagation (ICAP) 1989, Part 1, pp. 394–398 it is known that the relative dielectric constant, and by this the refractive index, of a dielectric material, such as polysterene, can be modified by a variation of density of said material.

Thereby hemisperical shells with given refraction indexes may be produced.

From U.S. Pat. No. 3,307,196 a method is known, which allows the production of a two-dimensional dielectric lens, such as a disk, by winding a ribbon, shut or strip type of module.

In the U.S. Pat. No. 3,307,196 it is proposed to fabricate a three-dimensional dielectric lens by the individual preparation of wound disks, which are superposed upon one another. The superposed disks are of successively different diameters and dielectric profile and could be formed, starting with individual substantially strip or ribbon modules, by cutting successively different lengths away from the high dielectric constant ends of said different strips, and then rewinding the resultant successively different length strips.

There are two disadvantages in the known methods for the fabrication of three-dimensional lenses. It is either possible just to approximate the variation of the refractive index required, which is dependent on the dielectric constant. 0r it is necessary to carry out a large number of steps. That means no easy and practical method for smoothly varying the refractive index has been achieved.

By using shells with different dielectric constants and thereby with different refractive indexes, reflection losses occur by which power is reflected from the dielectric boundaries.

It is an object of the invention, to present an easy method for the fabrication of lenses with a variable refractive index, which overcomes the deficiencies of the prior art.

The invention fulfills this object.

The method according to the invention allows to produce three-dimensional lenses with a variable refractive index n by wrapping a material with a given refractive index, e.g such as the known materials from U.S. Pat. No. 4,288,337, into the final shape of the lens to be produced.

It is an advantage of the invention to present a method for the fabrication with a reduced number of steps.

It is a further advantage of the invention to produce lenses with a better aperture efficiency by avoiding surface waves, which are set up at the spherical boundaries, and by achieving a more exact phase of the collimated rays at the feed points, which makes the lens less frequency dependent.

When the material with the given refractive index is shaped as a thread, the method for the fabrication can be executed more easily.

Figure 2:
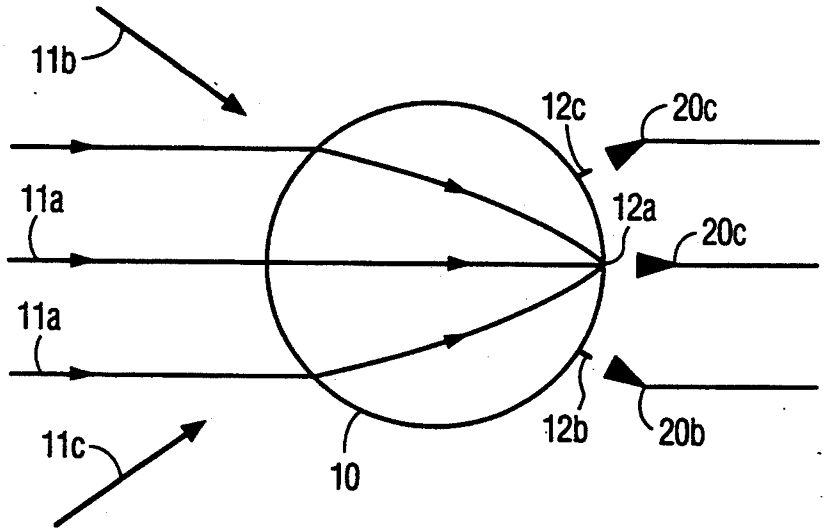
FIG. 2 PRIOR ART
Figure 3:
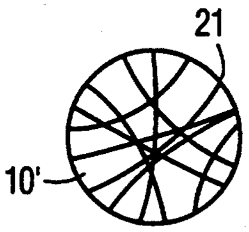
Figure 4A:
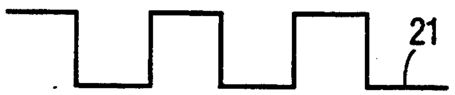

The present invention will be better understood with the aid of the following description and accompanying drawings, wherein FIG. 1 shows a known Luneburg lens radar reflector, FIG. 2 shows a known Luneburg lens antenna, FIG. 3, shows a preferred embodiment, FIGS. 4*a*, *b* show possible shapes of thread used.

Prior to the detailed description it should be mentioned, that in the preferred embodiment the lenses to be produced are able to refract electromagnetic waves, preferably microwaves. In this case the material with a given refractive index n is a dielectric material and the refractive index n is given by the expression $$E=n^2,$$

where E is the relative dielectric constant.

Though the preferred embodiment is shown with lenses for electromagnetic waves, it should be kept in mind, that the invention is not limited to such lenses. By using a material with an appropriate refractive index even lenses, which are able to refract any other waves, e.g. sound waves, may be produced.

FIG. 1 shows a three-dimensional Luneburg lens 10, which works as radar reflector and as is state of the art. An incoming wave 11 is focussed by the lens 10 in such a way that the wave is focussed on a focus point 12. The wave is reflected by a reflector 13, whereby the reflected wave 14 is generated, which is led by the lens 10 in such a way, that it leaves the lens 10 in the same direction as the incoming wave 11 came from.

For leading the incoming wave 11 and the reflected wave 14 in the desired manner, it is necessary, that the relationship between the relative dielectric constant E(r) and the normalized radius r/a is given by $$E(r)=2-(r/a)^2, \qquad (1)$$

where r is the distance from the center point, a is the radius of the lens 10, and r/a=1.0 at the outer surface of the lens.

FIG. 2 shows another application of the Luneburg lens 10. The difference between this embodiment and the embodiment of FIG. 1 is, that here an incoming wave, such as 11*a* is led to a first focus point 12*a* and received by a first feeder horn 20*a*. In the same manner incoming waves 11*b* and 11*c* are led to focus points 12*b*, 12*c* and received by feeder horns 20*b*, 20*c* respectively. The signals received by the feeder horns 20*a*, 20*b*, 20*c* are fed to receivers, not shown.

Of course the system according to FIG. 2 can also work as transmitter antenna, if transmitters are connected to the feeder horns 20*a*, 20*b*, 20*c*.

According to the invention the three-dimensional lens 10 is produced by wrapping a dielectric material, preferably shaped as a thread. This is in principle shown in FIG. 3.

Starting at the center point of a lens 10' to be produced, a dielectric thread 21 is wrapped around the center point. Said thread has at least initially a relative dielectric constant E=2.0. With an increasing distance from the center point the effective relative dielectric constant E(r) of the lens 10' to be produced decreases according to the formula (1).

The effective relative dielectric constant may be varied by a variation of the relative dielectric constant E of the thread. This could be achieved e.g. by a variation of the chemical composition or by a variation of the density of said thread with length. A variation of density with length could be achieved e.g. by a variation of pressure, proceeded by a press arranged before the lens 10' to be produced.

Another possibility of variation of the relative dielectric constant E may be achieved by a thread, created by several strands, whereby the number and/or the relative dielectric constant E of said strands may vary with length.

It is still another possibility to vary the effective dielectric constant E by a variation of the amount of trapped air (E=1).

This might be realized e.g. by a variation of the thickness of the thread, whereby the amount of trapped air is increased and thereby the effective relative dielectric constant is decreased.

Figure 4B:

It is another possibility to use a crimped thread, e.g. like it is shown in FIGS. 4*a* or 4*b*, which might be stretched by a variation of a stretching force used.

The dielectric constant of the thread may also be varied along the length with the aid of a metallic paint. In this case a low density dielectric thread of constant dielectric constant is used and as it is wrapped into the shape of the lens to be produced small areas of the thread are painted at a separation necessary to give the correct dielectric constant profile. That means for a desi red value of the effective refractive index the thread used is painted with a paint, which may be metallic. Thickness, density and/or intensity of this paint may be varied. This is a simple method and will result in a relatively light lens.

It is to be said, that electromagnetic scattering by individual strands of the thread can be made negligible by keeping the radial dimensions of the thread 21 small.

Versions of the preferred embodiment may contain at least one of the following variations:

- instead of a thread, the material with the given refractive index may have any other appropriate shape, e.g. like a strip, ribbon, or the like
- by using an appropriate dielectric material, the lens to be produced may be able to refract other electromagnetic waves, such as visible or infrared light,
- by an appropriate wrapping process, lenses with non-spherical shapes may be produced,
- the lens to be produced may have any desired relation ship between the effective dielectric constant E(r) or
- the refractive index respectively and the normalized radius r/a, e.g. in that way, that the focus point 12 is inside or outside of the surface of the lens,
- the wrapping process may start at the surface of a core, which itself might have a variation of the refractive index and might be located around the center point,
- several threads may be used, one after the other and/or at the same time,
- by using a material with an appropriate refractive index even lenses, which are able to refract any other waves, e.g. acoustic waves, may be produced,
- a bonding agent may be used, which e.g. might be wrapped with the dielectric thread and when cured at an elevated temperature forms a more solid lens. Of course, it might also be possible to dip the lens to be produced into an appropriate bonding agent during and/or after the wrapping process.

The invention presents a method for the fabrication or production of three-dimensional lenses with a variable effective refractive refractive index by wrapping a material with a given refractive index, which may be constant or may vary with length. It is preferred, that said material has the shape of a thread, which might be cylindrical.

The preferred shapes of the lens to be produced are spherical or semi-spherical. The latter one can be achieved by an appropriate wrapping process or by cutting the spherical shape.

By the inventive method it is possible to produce the said lenses with a smooth varying of the refractive index.

We claim:

1. A method of fabricating a three dimensional lens having a refractive index varying with an increasing distance from a physcial point comprising the step of wrapping a material having a selected refractive index about said physical point to produce said lens about said physical point, including the step of making the refractive index of said material different at selected locations along said material and including the steps of fabricating said material as a thread composed of a plurality of strands, and also including the step of changing the refractive index of said material by changing the number of strands at selected locations along said thread.

2. A method of fabricating a three dimensional lens having a refractive index varying with an increasing distance from a physical point comprising the step of wrapping a material having a selected refractive index about said physical point to produce said lens about said physical point, including the step of making the refractive index of said material different at selected locations along said material, and including the step of fabricating said material as a thread and also including the step of changing the refractive index of said material by changing the thickness of said thread at selected locations along the length of said thread.

3. A method of fabricating a three dimensional lens having a refractive index varying with an increasing distance from a physical point comprising the step of wrapping a material having a selected refractive index about said physical point to produce said lens about said physical point, including the step of fabricating said material as a crimped thread.

4. The method of claim 3 further including the step of varying the refractive index of said material by stretching said crimped thread with a selected variable force.

5. A method of fabricating a three dimensional lens having a refractive index varying with an increasing distance from a physical point comprising the step of wrapping a material having a selected refractive index about said physical point to produce said lens about said physical point, including the step of dipping said lens in a bonding agent after said wrapping.

6. A method of fabricating a three dimensional lens having a refractive index varying with an increasing distance from a physical point comprising the step of wrapping a material having a selected refractive index about said physical point to produce said lens about said phsical point, including the step of painting small areas of said material at separations selected to result in a desired refractive index profile.

* * * * *